United States Patent
Rittner et al.

(10) Patent No.: US 8,978,644 B2
(45) Date of Patent: Mar. 17, 2015

(54) PASSENGER SERVICE UNIT WITH EMERGENCY OXYGEN SUPPLY AND READING LIGHT

(75) Inventors: Wolfgang Rittner, Ahrensbok (DE); Ruediger Meckes, Berkenthin (DE)

(73) Assignee: Zodiac Aerotechnics, Plaisir (FR)

( * ) Notice: Subject to any disclaimer, the term of this patent is extended or adjusted under 35 U.S.C. 154(b) by 0 days.

(21) Appl. No.: 13/351,308

(22) Filed: Jan. 17, 2012

(65) Prior Publication Data

US 2013/0180522 A1 Jul. 18, 2013

(30) Foreign Application Priority Data

Jan. 16, 2012 (EP) .................................... 12151298

(51) Int. Cl.
*A62B 7/00* (2006.01)
*H01L 35/28* (2006.01)
*A62B 18/02* (2006.01)
*F21V 33/00* (2006.01)

(52) U.S. Cl.
USPC .................................................. 128/202.13

(58) Field of Classification Search
USPC ............ 128/204.18, 204.21, 205.11–205.17; 244/118.5, 129.1; 604/290, 319; 136/206, 246
See application file for complete search history.

(56) References Cited

U.S. PATENT DOCUMENTS

| | | | |
|---|---|---|---|
| 2,358,681 A * | 9/1944 | Beetem | 320/138 |
| 3,023,257 A * | 2/1962 | Fritts | 136/206 |
| 4,978,890 A * | 12/1990 | Sekiguchi et al. | 315/117 |
| 5,567,230 A | 10/1996 | Sinclair | |
| RE36,642 E * | 4/2000 | Ziadi | 362/471 |
| 6,818,818 B2 * | 11/2004 | Bareis | 136/246 |
| 7,416,313 B2 * | 8/2008 | Westphal et al. | 362/249.07 |
| 2004/0155251 A1 | 8/2004 | Abramov et al. | |
| 2006/0023463 A1 * | 2/2006 | Bigge et al. | 362/494 |
| 2007/0057121 A1 * | 3/2007 | Callahan et al. | 244/118.5 |
| 2011/0259386 A1 * | 10/2011 | Lee et al. | 136/206 |
| 2012/0205491 A1 * | 8/2012 | Rittner et al. | 244/118.5 |

FOREIGN PATENT DOCUMENTS

| EP | 2178118 | 4/2010 |
|---|---|---|
| JP | 2007036166 | 2/2007 |

OTHER PUBLICATIONS

Search Report dated May 26, 2012 in related European Patent Application No. 12151298.2.

* cited by examiner

*Primary Examiner* — Tan-Uyen (Jackie) T Ho
*Assistant Examiner* — Mark Wardas
(74) *Attorney, Agent, or Firm* — Kilpatrick Townsend & Stockton LLP; Dean W. Russell; Kristin M. Crall

(57) ABSTRACT

The invention relates to a passenger service unit (PSU) for use in an aircraft, comprising a reading light having a light source and a reflector partially enclosing the light source, and an emergency oxygen supply device comprising an oxygen source, a starter unit for releasing oxygen flow from said oxygen source to an oxygen mask, a control unit for controlling oxygen flow rate from said oxygen source to said oxygen mask and an electrical energy storage device like a rechargeable battery pack or a condensator, for providing electrical energy to said control unit and/or said starter unit. According to the invention, the PSU comprises an energy harvesting unit adjacent to or integrated into said reflector of said reading light wherein said energy harvesting unit is electrically connected to said electrical energy storage device.

9 Claims, 1 Drawing Sheet

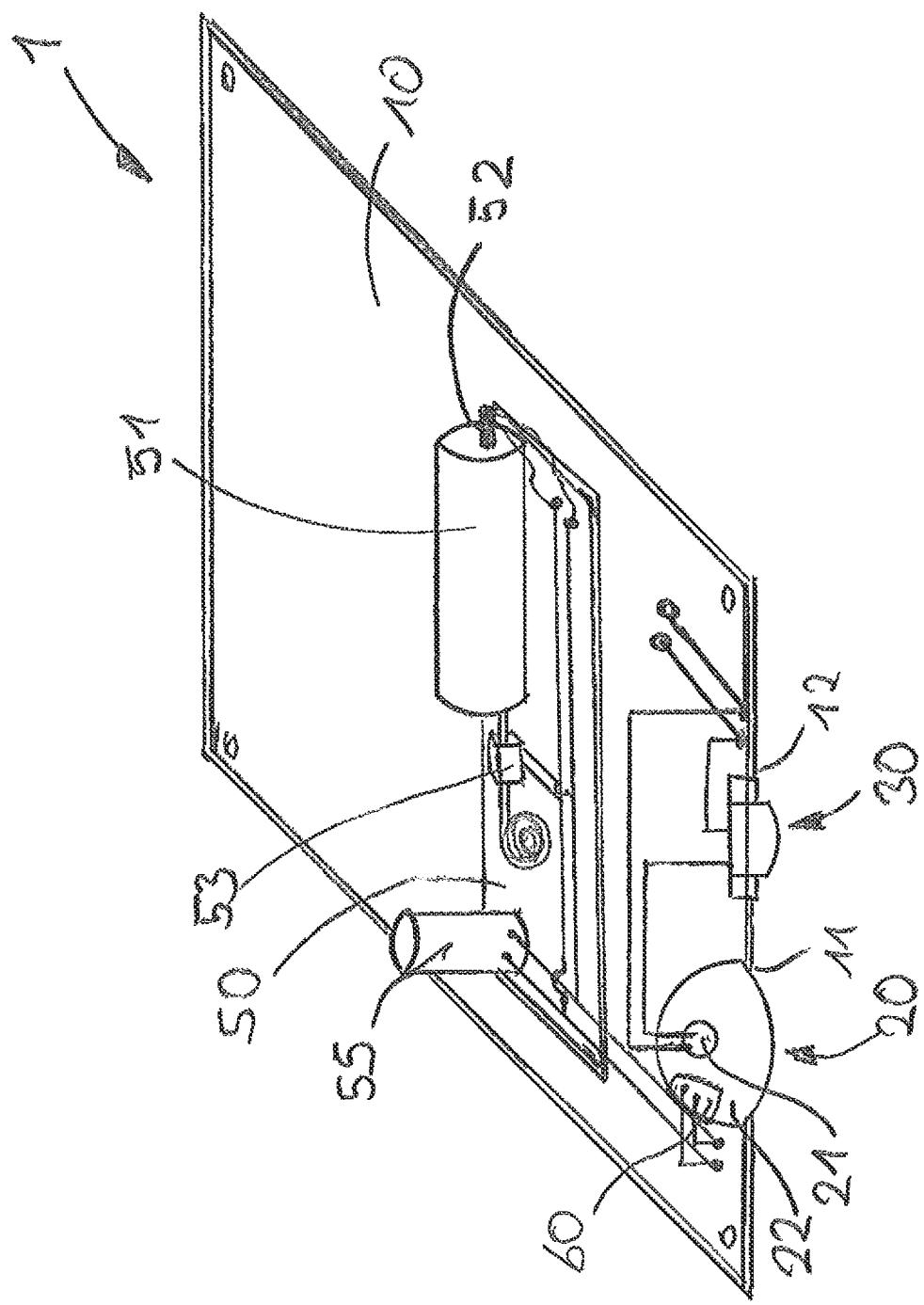

PASSENGER SERVICE UNIT WITH EMERGENCY OXYGEN SUPPLY AND READING LIGHT

CROSS-REFERENCE TO RELATED APPLICATION

This application claims priority to European Patent Application No. EP12151298.2 filed with the European Patent Office on Jan. 16, 2012, the contents of which are incorporated herein by reference.

FIELD OF THE INVENTION

The invention relates to a passenger service unit for use in an aircraft, comprising a reading light having a light source and a reflector partially enclosing the light source, and an emergency oxygen supply device comprising an oxygen source, a starter unit for releasing oxygen flow from said oxygen source to an oxygen mask, a control unit for controlling oxygen flow rate from said oxygen source to said oxygen mask and an electrical energy storage device like a rechargeable battery pack or a condensator, for providing electrical energy to said control unit and/or said starter unit.

BACKGROUND OF THE INVENTION

Generally, passenger service units (PSU) are installed close to a passenger seat, for example above a passenger seat to provide entertainment and safety services to the passenger. A PSU may contain different devices and may comprise these devices for a single or a plurality of passengers. Usually, a PSU comprises a display unit for providing safety information to a passenger, a reading light and a ventilation nozzle. Furthermore, an interface may be present for requesting help by the cabin crew or the like.

Furthermore, besides such a PSU, an emergency oxygen device may be installed in an aircraft. Such emergency oxygen device serves to provide oxygen to a passenger in case of an emergency like a decompression situation. In such case, oxygen flow from an oxygen source is provided by said emergency oxygen device to an oxygen mask which can be worn by the passenger. For this purpose, the oxygen flow must be started which can be done by different starter units, some of which require electrical energy for activation. Further, during use of the emergency oxygen device and supply of the oxygen a pressure and amount of the oxygen shall be controlled by a control unit included in the emergency oxygen device which very often requires electrical energy.

SUMMARY OF THE INVENTION

The reasons for an emergency situation maybe quite different and may include a general breakdown of power supply within the aircraft. It is a first object of the invention to improve safety of such emergency oxygen devices in case of any type of failure within the aircraft leading to an emergency situation and the need to supply oxygen to the passenger.

A current desire in building modern aircraft is to reduce the overall weight of the aircraft in order to save fuel. By this, it is a general goal to provide cabin interior system with reduced weight. It is a further object of the invention to reduce the weight of an emergency oxygen device without sacrificing its safety and maintenance cycle times.

According to the invention, this problem is solved by a passenger service unit as described in the introductory portion having an energy harvesting unit adjacent to or integrated into said reflector of said reading light wherein said energy harvesting unit is electrically connected to said electrical energy storage device.

According to the invention, a PSU is provided which comprises a reading light and an emergency oxygen device. The emergency oxygen device comprises an energy storage unit for storing electrical energy. This energy storage unit is a rechargeable unit and can be kept in a fully loaded state within the emergency oxygen device. By this, sufficient electrically energy is stored within the device to ensure a proper ignition and control of the oxygen supply in an emergency situation.

The electrical energy required for maintaining the fully loaded state of the energy storage device is provided by an energy harvesting element adjacent to the reflector of the reading light. Such energy harvesting element may comprise a Peltier element using the heat dissipated from the light source of the reading light to convert this heat as a gradient into electrical energy. Alternatively, the energy harvesting element may be a photovoltaic element converting light emission by a photovoltaic reaction into electrical energy. Other types of energy harvesting elements may be used as well.

The invention makes use of the close arrangement of emergency oxygen devices and reading lights in usual interior design of modern aircraft. By this, the use of the reading light can be applied for providing electrical energy to the storage unit within the emergency oxygen device. This allows for a lightweight and compact design of the PSU. Further, the PSU according to the invention does not require a separate energy supply line to provide electrical energy out of the electrical installation system of the aircraft itself to the emergency oxygen device. Thus, a significant amount of wiring is not required resulting in a significant reduction of weight of the cabin interior when using the PSU according to the invention. Still further, the installation process of the PSU according to the invention is easier and faster than in the prior art in that a single, compact PSU is to be installed only and no wiring to the electrical system of the aircraft needs to be established to provide electrical energy to the emergency oxygen device.

The reflector may preferably be of convex shape and partly surround the light source.

It is important to note that energy to be provided to non-essential devices like reading lights often follows simpler provisions and regulations than energy required for driving essential devices like emergency oxygen units within an aircraft. Thus, the option to abandon a supply line to the emergency oxygen device is a significant advantage even if the supply line to the reading light still has to be provided.

From EP 2 178 118 it is known to provide a light emitting diode arrangement comprising a Peltier element to convert thermal energy transmitted from said light emitting diode into electrical energy in a first mode of operation and to cool down the light emitting diode by providing electrical energy to said Peltier element in a second mode of operation. This arrangement requires for a specific thermal coupling of a heat conductor with the anode or the source of the diode and the Peltier element which results in a difficult construction and mounting of the arrangement. Further, the diode arrangement according to this prior art seeks to generally save electrical energy or to enhance the light emission and lifetime of the diode but does not significantly contribute to a lightweight construction of an aircraft at all. JP 2007-36166 A shows a similar arrangement wherein a Peltier device is included in a circuit comprising a light emitting part.

From US 2004/0155251 it is known to cool down electronic devices using a Peltier element thermally coupled to said devices. Whereas by such a use the lifetime and power of any electronic device may be enhanced by a general reduction of temperature this prior art is neither adapted nor intended to help reducing the weight of aircraft or the safety of emergency systems installed in such an aircraft.

According to a first preferred embodiment, the energy harvesting unit is selected from a Peltier element or a photovoltaic cell. By using such energy harvesting units, an effective conversion of heat or light energy is achieved. It is to be understood that other energy harvesting units with a different principle may be used as well in the invention. It is also to be understood that a combination of two or more energy harvesting units may be used, wherein the two or more energy harvesting units have different principles of function.

Still further it is preferred that said reflector is at least partly semitransparent and arranged between said light source and said energy harvesting element. With this embodiment, a part of the light emitted by said light source is reflected by the reflector and another part it is transmitted through the reflector to transfer energy to the energy harvesting element. It is to understood that the term "semi transparent" shall primarily be understood to apply to a partly reflection of light and may alternatively or additionally be interpreted to mean a partial reflection or transmission, respectively, of heat.

Still further, it is preferred that said energy harvesting element is mounted to said reflector. By this, the reflector and the energy harvesting element are provided as an integral unit, e.g. by way of coating the reflector or mounting the energy harvesting element to the outer surface of the reflector or the like.

According to a further preferred embodiment said energy harvesting element is provided as a layer of said reflector. Said layer may be provided as a coating or a flexible element attached to the reflector or the like to achieve a high efficiency in harvesting energy from the reading light.

According to a further preferred embodiment said energy harvesting element is a section of said reflector. Said section of the reflector may for example be a part of the circumference of the reflector, a ring-shaped part of the reflector or any other geometrical partial section of the reflector surface. It is to be understood that in this embodiment the reflecting surface of the reflector is not between the energy harvesting element and the light source. This embodiment particularly contributes to the efficiency of the light emission by the reading light to the passenger on the one hand and the energy harvesting for the emergency oxygen device on the other hand in that a first section of the reflector can be used for complete reflection of the light and a second section of the reflector is used for energy harvesting, i.e. is absorbing a part of the energy dissipated by the light source of the reading light and thus reduces the light emitted by said reading light to the passenger.

It is preferred that said emergency oxygen supply device is not connected to a power supply outside of the PSU. According to this embodiment a power supply line from the aircraft power system to the emergency oxygen device is not required and thus a lightweight construction is achieved.

Still further it is preferred that said oxygen source is an oxygen reservoir comprising a limited amount of oxygen and said energy storage device has a capacity which is sufficient to provide an amount of energy for starting said oxygen supply via said starter unit and for providing electrical energy to said control unit during supply of the whole oxygen contained in said oxygen reservoir. Using this embodiment a high degree of safety and reliability of the emergency oxygen device can be achieved in that the operation of the emergency oxygen device during the whole time which is limited by the amount of oxygen within the oxygen reservoir can be maintained with the electrical energy stored in the energy storage device. It is to be understood that the whole time is defined by our traffic regulations to be the minimum operation time to be fulfilled by oxygen emergency devices.

Finally, it is preferred that a plurality of reading lights is provided within the PSU and at least two reading lights comprise an energy harvesting element adjacent to the reflector and said at least two energy harvesting elements are connected to a single energy storage devices. This particular preferred embodiment allows for a safe supply of electrical energy to the electrical storage device using more that one reading light. This is particular useful in case that a single PSU is mounted for a plurality of passengers, i.e. three passengers in a row of the aircraft or in an arrangement where e.g. three single PSUs are mounted side by side and can be connected for exchange of energy harvested from the single reading lights within each PSU. By interconnecting a plurality of reading lights with one single electrical storage device the fully load state of said storage device is ensured even in a situation where a single reading light has not been in use for a longer period of time. It is to be understood that this principle can be applied further to arrangements wherein a plurality of reading lights are connected to a plurality of electrical storage devices in order to avoid low power states in one single electrical storage device on a statistical approach of the use of the reading lights.

A further embodiment of the invention is a method of operating an emergency oxygen device for supply of oxygen to a passenger of an aircraft. Said method comprises the steps of charging a rechargeable battery with electrical current which is energy harvested by an energy harvesting device adjacent to a reflector of a reading light of a passenger service unit comprising the emergency oxygen device and supplying electrical energy out of said rechargeable battery in case of an emergency to start the oxygen supply and/or to control the oxygen flow with a control unit of said emergency oxygen device. The method can be further improved in that the energy is harvested using a Peltier element or a photovoltaic element. In particular, said energy harvesting element can be directly attached to the reflector and light emitted by the light source of the reading light can be directed to said energy harvesting element through a semi transparent section of said reflector.

Further, an aspect of the invention is the use of an energy harvesting element adjacent or attached to a reflector of a reading light for supplying electrical energy to a rechargeable energy storage device of an emergency oxygen device of a passenger service unit for an aircraft.

BRIEF DESCRIPTION OF THE DRAWING

A preferred embodiment of the invention is further explained with reference to FIG. 1.

The FIGURE shows as schematic, perspective view of a preferred embodiment of a passenger service unit (PSU) according to the invention.

DETAILED DESCRIPTION

As shown in FIG. 1, a PSU 1 comprises a base plate 10 which is adapted to be mounted in the aircraft interior lining by respective mounting means.

The base plate 10 comprises two adjacent openings 11, 12 wherein a reading light 20 and an activation switch 30 for said reading light is mounted.

The reading light 20 is shown in a schematic, sectional view. As can be seen, the reading light 20 comprises a light source 21 and a convex reflector 22 surrounding partially said light source 21. The light source is connected via electrical wiring to the activation switch and a main electrical power source.

Further, a lid 50 is mounted into a rectangular recess in the base plate 10. Said lid 50 carries a chemical oxygen generator 51 with an ignition starter 52 at its first end. The chemical oxygen generator is connected via an oxygen supply line with a control unit 53 and a flexible supply line to be connected to an oxygen mask (not shown).

Still further, a rechargeable battery 55 is mounted to said lid 50 and electrically connected to the control unit 53 and the ignition unit 52.

The rechargeable battery pack 55 is further electrically connected to a photovoltaic element 60 which is directly attached to the outside of the reflector 22. The reflector 22 is semitransparent By this electrical connection, the rechargeable battery 55 is periodically charged in times when the reading light 20 is switched on so that the photovoltaic element 60 produces an electrical current and supplies this current to the rechargeable battery 55. The rechargeable battery 55 has a capacity which is sufficient to activate the ignition unit 52 and to supply an electrical voltage at a sufficient level to the control unit 53 during supply of oxygen out of the chemical oxygen generator 51 from start until complete exhaustion of the generator.

A further embodiment of the invention is a method of operating an emergency oxygen device for supply of oxygen to a passenger of an aircraft. Said method comprises the steps of charging a rechargeable battery with electrical current which is energy harvested by an energy harvesting device adjacent to a reflector of a reading light of a passenger service unit comprising the emergency oxygen device and supplying electrical energy out of said rechargeable battery in case of an emergency to start the oxygen supply and/or to control the oxygen flow with a control unit of said emergency oxygen device. The method can be further improved in that the energy is harvested using a Peltier element or a photovoltaic element. In particular, said energy harvesting element can be directly attached to the reflector and light emitted by the light source of the reading light can be directed to said energy harvesting element through a semi transparent section of said reflector.

Further, an aspect of the invention is the use of an energy harvesting element adjacent or attached to a reflector of a reading light for supplying electrical energy to a rechargeable energy storage device of an emergency oxygen device of a passenger service unit for an aircraft.

The invention claimed is:

1. A passenger service unit for use in an aircraft, comprising
    a reading light in the aircraft having a light source and a reflector partially enclosing the light source, and
    an emergency oxygen supply device comprising an oxygen source, a starter unit for releasing oxygen flow from said oxygen source to an oxygen mask, a control unit for controlling oxygen flow rate from said oxygen source to said oxygen mask, and an electrical energy storage device for providing electrical energy to said control unit and/or said starter unit,
    further comprising an energy harvesting unit adjacent to or integrated into said reflector of said reading light wherein said energy harvesting unit is electrically connected to said electrical energy storage device, wherein the reflector comprises a semitransparent surface, such that a first amount of light emitted by the light source is reflected by the semitransparent surface and a second amount of light that is effective for energy harvesting emitted by the light source is transmitted through the semitransparent surface, wherein the reflector is arranged between the light source and the energy harvesting unit.

2. The passenger service unit according to claim 1,
    wherein said energy harvesting unit is selected from
        a Peltier element,
        a photovoltaic cell.

3. The passenger service unit according to claim 1,
    wherein said energy harvesting element is mounted to said reflector.

4. The passenger service unit according to claim 1,
    wherein said energy harvesting element is provided as a layer of said reflector.

5. The passenger service unit according to claim 1,
    wherein said energy harvesting element is a section of said reflector.

6. The passenger service unit according to claim 1,
    wherein said emergency oxygen supply device is not connected to a power supply outside of the PSU.

7. The passenger service unit according to claim 1,
    wherein said oxygen source is an oxygen reservoir comprising a limited amount of oxygen and said energy storage device has a capacity which is sufficient to provide an amount of energy for starting said oxygen supply via said starter unit and for providing electrical energy to said control unit during a minimum operation time to be fulfilled by oxygen emergency devices.

8. The passenger service unit according to claim 1,
    wherein a plurality of reading lights is provided within the passenger service unit and at least two reading lights comprise an energy harvesting element adjacent to each reflector and each energy harvesting element of the at least two reading lights is connected to a single energy storage device.

9. The passenger service unit according to claim 1, wherein the electrical energy storage device comprises a rechargeable battery pack or a condensator.

* * * * *

UNITED STATES PATENT AND TRADEMARK OFFICE
CERTIFICATE OF CORRECTION

PATENT NO.          : 8,978,644 B2
APPLICATION NO.     : 13/351308
DATED               : March 17, 2015
INVENTOR(S)         : Wolfgang Rittner and Rüdiger Meckes It is certified that error appears in the above-identified patent and that said Letters Patent is hereby corrected as shown below:

Title page

In the Inventors, Item (75), please correct the inventor's name to read:

--Rüdiger--

In the Foreign Application Priority Data, Item (30), the priority number is missing a number. Please correct the priority number to read:

--12151298.2--

In the References Cited, Item (56), under Other Publications, the date for the Search Report should be corrected. Please correct the date to read:

--June 28, 2012--

Signed and Sealed this
Twenty-ninth Day of March, 2016

Michelle K. Lee
*Director of the United States Patent and Trademark Office*